(12) United States Patent
Cordier et al.

(10) Patent No.: US 12,532,261 B2
(45) Date of Patent: Jan. 20, 2026

(54) NFC DEVICE DETECTION

(71) Applicant: STMicroelectronics (Rousset) SAS, Rousset (FR)

(72) Inventors: Nicolas Cordier, Aix-en-Provence (FR); Guillaume Jaunet, Pegomas (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 324 days.

(21) Appl. No.: 18/077,396

(22) Filed: Dec. 8, 2022

(65) Prior Publication Data

US 2023/0189149 A1 Jun. 15, 2023

(30) Foreign Application Priority Data

Dec. 14, 2021 (FR) ..................................... 2113489

(51) Int. Cl.
*H04W 52/02* (2009.01)
*H04B 5/48* (2024.01)
(52) U.S. Cl.
CPC .......... *H04W 52/0229* (2013.01); *H04B 5/48* (2024.01)
(58) Field of Classification Search
CPC ............................ H04W 52/0229; H04B 5/48
See application file for complete search history.

(56) References Cited

U.S. PATENT DOCUMENTS

2014/0141715 A1* 5/2014 Smith .............. H04B 5/45 455/41.1
2014/0148095 A1* 5/2014 Smith .............. H04B 7/0802 455/41.1
2018/0091193 A1 3/2018 Hagedorn
2018/0115948 A1 4/2018 Choi et al.
2019/0181919 A1* 6/2019 Tramoni ........... H04W 52/0225
2020/0091965 A1 3/2020 Chauvin et al.
2020/0229091 A1 7/2020 Wobak et al.
2021/0150882 A1 5/2021 Wobak et al.
2021/0328625 A1 10/2021 Tramoni et al.

FOREIGN PATENT DOCUMENTS

| CN | 109905861 A | 6/2019 |
|---|---|---|
| CN | 111342866 A | 6/2020 |
| CN | 112039226 A | 12/2020 |
| CN | 112821923 A | 5/2021 |
| EP | 3681103 A1 | 7/2020 |

OTHER PUBLICATIONS

INPI Search Report and Written Opinion for priority application, FR 2113489, report dated Jul. 30, 2022, 8 pgs.
CN First Office Action and Search Report for counterpart CN Appl. No. 202211600228.5, report dated Aug. 26, 2025, 14 pgs.

* cited by examiner

*Primary Examiner* — David Bilodeau
(74) *Attorney, Agent, or Firm* — Crowe & Dunlevy LLC

(57) ABSTRACT

In the case of a potential detection, by a first near field communication (NFC) device, of a second NFC device, a validation of this detection is performed according to the time variation gradient of at least one environmental condition of the first device. A value of one of an amplitude and an phase of a signal across an oscillating circuit of the first NFC device is compared to first thresholds to potentially detect the second NFC device. Validation of detection occurs when one of the amplitude and the phase of the signal is outside the first thresholds adjusted as a function of the time variation gradient. Validation detection also occurs when one of the amplitude and the phase of the signal adjusted as a function of the time variation gradient is outside the first thresholds.

28 Claims, 6 Drawing Sheets

NFC DEVICE DETECTION

PRIORITY CLAIM

This application claims the priority benefit of French Application for Patent No. 2113489, filed on Dec. 14, 2021, the content of which is hereby incorporated by reference in its entirety to the maximum extent allowable by law.

TECHNICAL FIELD

The present disclosure generally concerns electronic circuits and, more specifically, electromagnetic transponders or electronic tags. The present disclosure particularly applies to electronic devices integrating a near-field communication circuit (NFC), more commonly called NFC devices, and to the detection of the presence of such a device in the field of another device.

BACKGROUND

Communication systems comprising electromagnetic transponders are more and more frequent, particularly since the development of near-field communication technologies. These systems typically use a radio frequency electromagnetic field generated by an NFC device (terminal or reader) to detect and then communicate with another NFC device (card) located within range.

Most of the time, NFC devices are battery-powered. Periods of use of their functions and circuits are then generally separated by standby periods. Standby periods particularly enable to lower the power consumption of NFC devices. An NFC device then has to be "woken up" when it detects an electronic tag or another device within range. It is however advantageous for NFC devices to remain at standby for as long as possible.

SUMMARY

An embodiment reduces all or part of the disadvantages of known techniques of detection of the presence of an electronic device integrating a near-field communication circuit by another electronic device emitting an electromagnetic field, more particularly during standby periods.

An embodiment provides a solution taking into account variations of environmental conditions.

An embodiment provides a method wherein, in case of a potential detection, by a first NFC device, of a second NFC device, a validation of this detection is performed according to the time variation gradient of at least one environmental condition of the first device.

According to an embodiment, the environmental condition is temperature.

According to an embodiment, the detection is identified by the crossing, by a value of at least one characteristic quantity of a signal across an oscillating circuit, of the first device of detection thresholds.

According to an embodiment, the thresholds correspond to first and second thresholds delimiting a range of values of the characteristic quantity.

According to an embodiment, the detection thresholds delimit a range of values of said characteristic quantity without the presence of a second device.

According to an embodiment, in case of a crossing of one of the thresholds by the value of the characteristic quantity, the validation depends on the result of an additional comparison, with the detection thresholds, of a value compensated according to the variation gradient of the environmental condition.

According to an embodiment, in case of a crossing of one of the thresholds by the value of the characteristic quantity, the validation depends on the result of an additional comparison of said value with detection thresholds adjusted according to the variation gradient of the environmental condition.

According to an embodiment, the additional comparison is performed if said gradient is greater than a threshold gradient and the potential detection is validated in the opposite case.

According to an embodiment, the detection thresholds are adjusted according to the result of the validation of a potential detection.

According to an embodiment, the detection thresholds are adjusted according to said gradient of said environmental condition of the first device.

According to an embodiment, a characteristic quantity corresponds to an amplitude of the signal across the oscillating circuit of the first device.

According to an embodiment, a characteristic quantity corresponds to a phase of the signal across the oscillating circuit of the first device.

According to an embodiment, said gradient corresponds to the variation of said environmental condition between two detection phases.

According to an embodiment, the first device comprises at least two operating modes, among which a first mode where detection bursts are spaced apart by a duration corresponding to at least one hundred times the duration of the bursts.

According to an embodiment, the first device switches to an operating mode of transmission of a polling sequence such as defined in the NFC Forum specifications when the second device is detected within range.

An embodiment provides a computer program product, comprising a non-transient storage support comprising instructions adapted to the implementation of the described method.

An embodiment provides an electronic device, comprising a computer program product.

An embodiment provides an electronic circuit adapted to the implementation of the described method.

An embodiment provides an electronic device, comprising an electronic circuit.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the generation of the radio frequency signals and the interpretation thereof have not been detailed, the described embodiments and implementation modes being compatible with usual techniques of generation and interpretation of these signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made, unless specified otherwise, to the orientation of the figures.

Unless specified otherwise, the expressions "around", "approximately", "substantially" and "in the order of" signify within 10%, and preferably within 5%.

Figure 1:
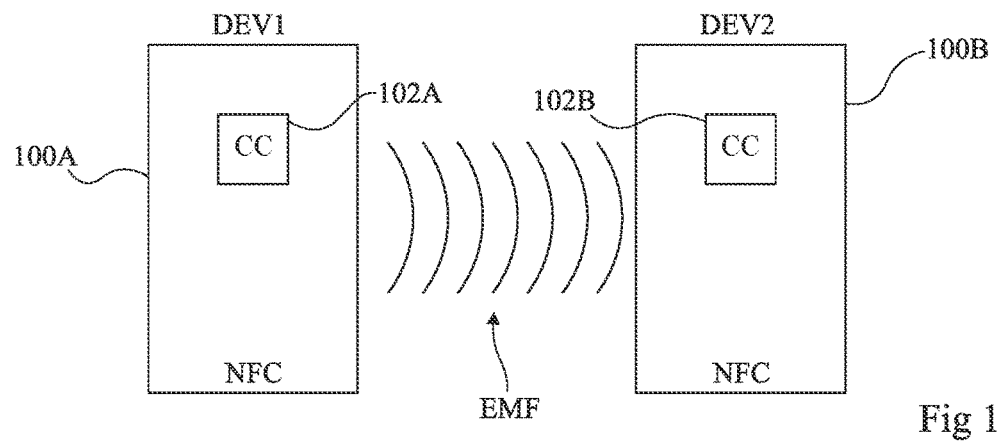
FIG. 1 very schematically shows in the form of blocks an example of a near-field communication system of the type to which apply, as an example, described embodiments and implementation modes.

FIG. 1 very schematically shows in the form of blocks an example of a near-field communication system of the type to which described embodiments and implementation modes apply as an example.

Although the case of two similar electronic devices, for example, two cell phones, is arbitrarily assumed, all that will be described more generally applies to any system where a reader or terminal radiates an electromagnetic field likely to detected by a transponder, be it an electronic tag (TAG), a microcircuit card (IC Card), a more sophisticated device (a telephone, for example), etc. For simplification, reference will be made to NFC devices to designate electronic devices integrating one or a plurality of near-field communication (NFC) circuits.

In the shown example, a first NFC device 100A (DEV1) is likely to communicate, by near-field electromagnetic coupling, with a second NFC device 100B (DEV2). According to applications, for a communication, one of NFC devices 100A, 100B operates in so-called reader mode while the other NFC device 100B, 100A operates in so-called card mode, or the two NFC devices 100A and 100B communicate in so-called peer-to-peer mode (P2P).

Each NFC device 100A, 100B integrates a near-field communication circuit (CC) symbolized, in FIG. 1, by a block 102A, 102B. Near-field communication circuits 102A and 102B each comprise various components or electronic circuits for generating or detecting a radio frequency signal by means of an antenna (not shown), for example using modulation or demodulation circuits. During a communication between NFC devices 100A and 100B, the radio frequency signal generated by one of NFC devices 100A, 100B is captured by the other NFC device 100B, 100A located within range.

In FIG. 1, it is arbitrarily assumed that the first NFC device 100A emits an electromagnetic field (EMF) detected by the second NFC device 100B within range. A coupling thus forms between two oscillating circuits, in the case in point that of the antenna of first NFC device 100A and that of the antenna of second NFC device 100B. This coupling results in a variation of the load formed by the circuits of NFC device 100B on the oscillating circuit for generating the EMF field of NFC device 100A.

In practice, to establish a communication, a phase or amplitude variation of the emitted field is detected by device 100A, which then starts a protocol of NFC communication with device 100B. On the side of NFC device 100A, it is detected in practice whether the amplitude of the voltage across the oscillating circuit and/or the phase shift with respect to the signal generated by circuit 102A come out of amplitude and/or phase ranges (or windows), each delimited by first and second thresholds. For example, the first threshold is lower than the second threshold. Reference will be made hereafter to lower and upper thresholds.

Once NFC device 100A has detected the presence of NFC device 100B in its field, it starts a procedure for establishing a communication, implementing transmissions of requests by NFC device 100A and of responses by NFC device 100B (polling sequence such as defined in the NFC Forum specifications). The circuits of NFC device 100B, if they were in standby mode, are then reactivated.

When an NFC device is not communicating, it is switched to the so-called low-power mode, or standby mode, to decrease the consumed power. This is particularly true for NFC devices powered by batteries. In the low-power mode, an NFC device configured in reader mode executes a so-called low-power card detection (LPCD) mode, also called low-power tag detection (LPTD), where it performs loops of detection of another device located in its field (within range) to leave a standby mode for communication purposes.

The detection is similar to that performed when the device is not in low-power mode. However, in normal mode, the emission of the carrier (of the field) is continuous and periodically includes polling phases while, in standby mode, the emission of the field is performed in periodic bursts and with no polling frame in order to decrease the power consumption. The bursts have a duration much shorter (by a ratio of at least ten, preferably of at least one hundred) than the duration of a card polling request in normal mode.

To simplify the following description, what is occurring at the level of one of the devices (for example, the first device 100A, FIG. 1) is considered. It should however be noted that in the presence of two similar devices 100A and 100B, that is, which are capable of operating both in card mode and in reader mode, for example, two cell phones, the described operation is similar for the two devices. In particular, the two devices in standby mode are in low-power tag detection mode (LPTD mode).

Figure 2:
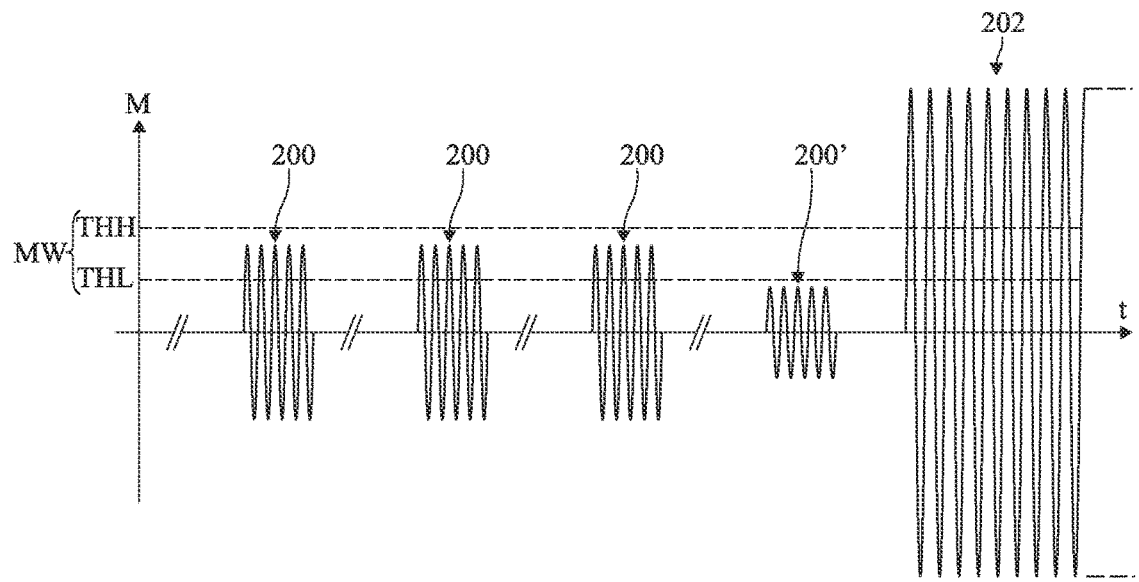
FIG. 2 is a timing diagram illustrating an example of a method of detection, by a device in reader mode and at standby, of a device in card mode.

FIG. 2 is a timing diagram illustrating an example of implementation of a method of detection, by a device in reader mode and in standby mode, for example, the first NFC device 100A (FIG. 1), of a device in card mode, for example, the second NFC device 100B (FIG. 1). FIG. 2 more particularly illustrates, very schematically, an example of shape of the variation over time t (in abscissas), of an amplitude M (in ordinates) of the signal across the oscillating circuit of NFC device 100A operating in reader mode.

When it is in standby mode, NFC device 100A, which attempts to detect the presence of the NFC device 100B within range, periodically emits a field burst 200. This detection burst 200 generally only comprises the carrier, typically at 13.56 MHz, with no modulation. Each emission burst thus includes a pulse train at the 13.56-MHz frequency. Each burst has a relatively short duration with respect to an interval between two bursts, preferably by a ratio of at least one hundred. The interval between two bursts depends on devices, but is generally of a few hundreds of milliseconds, for example, the burst frequency in LPDC mode is in the order of a few hertz, for example, in the order of 3 or 4 Hz. The duration of a burst 200 is in the order of some ten or hundred microseconds, for example, in the order of 30 microseconds.

As an example, device 100A temporarily and periodically leaves the standby mode to emit bursts 200. Generally, it is however preferred to use a state machine for the emission of bursts in low-power mode. This avoids waking up a microcontroller of device 100A and thus enables to remain in standby mode.

When device 100B is present in the field and modifies the load of the oscillating circuit of emitter device 100A, this causes a variation of a characteristic quantity of a signal across the oscillating circuit during a corresponding burst 200'. In practice, the modification of the load of the oscillating circuit of emitter device 100A causes an amplitude and/or phase variation of the signal across the oscillating circuit during burst 200'.

The amplitude and/or phase variations are detected by variations of signals in phase (I) or in phase quadrature (Q) supplied by a baseband detector measuring the signal across the oscillating circuit. These signals I and Q represent quantities characteristic of the signal across the oscillating circuit. To illustrate the operation, in the following FIGS. 2 and 3, only an amplitude variation across the oscillating circuit is expressed. However, the illustrated detections are in practice performed based on signals in phase (I) and in phase quadrature (Q) and on their respective amplitudes.

In the example of FIG. 2, it is arbitrarily assumed that the presence of device 100B causes an amplitude decrease (burst 200'). However, the presence of device 100B may, according to cases, also cause an increase in the amplitude. The same applies for the phase shift with respect to the transmitted signal.

In the example shown in FIG. 2, if amplitude variation M is sufficient to come out of an amplitude window or range MW, delimited by a lower threshold THL (or low threshold) and by an upper threshold THE (or high threshold), or to come out of a phase range or window, not shown, noted PW, emitter device 100A is activated (leaves the low-power mode). It starts emitting the field with polling frames 202 of a communication. These frames are standardized (they comply with the technical specifications of the NFC Forum) and are a function of communication protocols supported by reader 100A (typically, requests A, B, F, V such as described in the standard polling loop of the NFC Forum standard as understood by those skilled in the art). The duration of emission of a frame is generally in the range from a few milliseconds to a few tens of milliseconds.

If a device configured in card mode, for example, receiver device 100B (in card mode), is effectively present, this device then responds according to the request of the protocol that is supports and the communication starts. When the communication is over, or when receiver device 100B leaves the field, emitter device 100A switches back to the low-power mode after a given time (in the order of one second) to decrease its power consumption. It then starts periodically emitting detection bursts 200 with no communication request again.

However, if no device configured in card mode is present, within range, at the time when device 100A is activated after having considered that it has detected a card, the communication cannot be established. Emitter device 100A returns, for example, to the low-power mode after a given time (in the order of one second) to decrease its power consumption. It then starts periodically emitting detection bursts 200 with no communication request again.

Preferably, it is provided for emitting device 100A not to leave the low-power mode from as soon as the first crossing of an amplitude threshold and/or of a phase threshold as illustrated in FIG. 2, but at the end of a confirmation phase comprising a plurality of close bursts.

Figure 3:
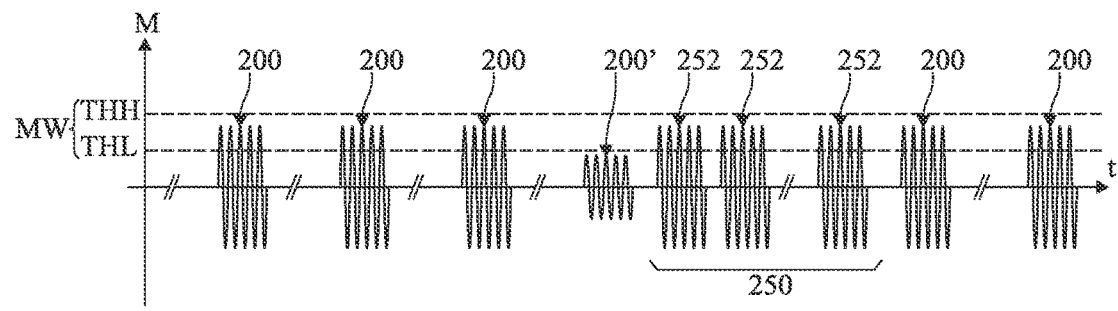
FIG. 3 is a timing diagram illustrating an implementation mode of a method of detection, by a device in reader mode and at standby, of a device in card mode.

FIG. 3 is a timing diagram illustrating such an example of implementation of a detection method. FIG. 3 very schematically illustrates an example of the curve of the variation over time t (in abscissas), of an amplitude M (in ordinates) of a signal across the oscillating circuit of NFC device 100A operating in reader mode.

The method of FIG. 3 comprises steps similar to those of the method of FIG. 2. These similar steps will not be described again hereafter.

According to the method illustrated in FIG. 3, it is provided for the state machine, in charge of the emission of periodic bursts 200, to enter a confirmation mode 250 when the amplitude and/or the phase of one of bursts 200 (for example, burst 200') comes out of window MW and/or of window PW for the first time. In confirmation mode 250, the state machine emits, for example, a plurality of field emission bursts 252, for example, eight or ten field emission bursts 252.

Bursts 252 are emitted by device 100A at a frequency greater than the frequency of emission of bursts 200. As an example, bursts 252 are emitted every 1 ms approximately, that is, at a frequency of approximately 1 kHz, to be compared with approximately 3 to 4 Hz for bursts 200. In practice, it is provided to estimate an average amplitude and an average phase of the bursts 252 emitted during confirmation mode 250.

In the example shown in FIG. 3, the average amplitude of bursts 252 does not come out of window MW. It is then considered, at the end of confirmation mode 250, that NFC device 100A has committed a detection error, for example that burst 200' was probably not due to the presence of a card within range but to a disturbance. NFC device 100A is then maintained in low-power mode, and the state machine starts emitting again, periodically, bursts 200. As compared with the example of FIG. 2, this thus enables to avoid an untimely leaving of standby of NFC device 100A caused by burst 200'.

In other words, as compared with the example illustrated in FIG. 2, this corresponds, when the coming out of the amplitude or phase window is detected, to starting emission 202 at the end of confirmation mode 250, and not directly after burst 200'.

It has already been provided to periodically adjust the detection thresholds to take into account environmental disturbances, particularly the temperature, of the electronic circuits performing the detection.

For example, reference is made to U.S. Pat. No. 10,505,592 corresponding to European Patent Reference No. EP 3495986 (both incorporated herein by reference) which describes an adaptation of the threshold windows according to the temperature variation or other disturbances.

According to another example, United States Patent Application Publication No. 2021/0328625 corresponding to European Patent Reference No. EP 3896864 (both incorporated by reference) describes the provision of phases of confirmation by the emission of close detection bursts as well as an adjustment of the amplitude or phase range of the detection windows (the interval between thresholds).

The adjustment of the detection windows according to the temperature variation combined with the provision of confirmation phases provides good results. However, abrupt temperature variations may occur to cause detection errors and the leaving of the LPTD low-power mode of NFC devices. Indeed, the adjustment of the detection threshold windows such as described in U.S. Pat. No. 10,505,592 takes into account the results obtained during bursts preceding the current burst (sliding average) and thus takes into account a relatively slow temperature variation.

Now, it is not unusual for other circuits equipping a device (for example, a cell phone) to be activated, thus causing an abrupt heating of the detection circuits. This abrupt heating is all the more present as the circuits dedicated to other functions are close to the NFC circuits.

Even though, in this case, the power overconsumption only occurs during polling phases since no NFC device responds (the crossing of the threshold is linked to a heating), it is preferable to avoid these useless power overconsumption phases. Indeed, the field emission in polling phase generates a power consumption in the order of 30-40 milliamperes in average for in the order of from 1 to 3 seconds according to the duration of the polling phases (typically, polling phases consuming in the order of 300 milliamperes are emitted twice per second and last for approximately 60 milliseconds each when all technologies are active (A, B, F, and V)), to be compared with a power consumption in LPTD mode in the order of 100 microamperes in average (typically, bursts consuming in the order of 250 milliamperes are emitted 3-4 times per second and each last for approximately 30 microseconds).

Although it is not excluded for them to also occur in case of an abrupt cooling, the untimely leaving the standby mode essentially occurs as a result of an abrupt heating caused by the activation of an electronic circuit other than NFC. Indeed, the inner cooling as a result of a deactivation or of the passage to standby mode is generally slower and is compatible with the response time of the threshold window adaptation methods. Typically, to satisfy the other threshold adaptation needs and particularly take into account the cooling of NFC circuits as a result of a setting to standby, a response time taking into account slow temperature variations, that is, lower than 2° C. per second, is provided. Now, a temperature increase resulting from the activation of an electronic circuit close to the NFC circuit or router may reach 5° C. per second and is frequently in the order of 3° C. per second. The detection thresholds are then crossed.

The described embodiments provide, in case of a detection of a crossing of a detection threshold, validating or invalidating this detection by taking into account the variation speed (the gradient) of the temperature of the circuit environment.

It may be provided to add a temperature sensor to the NFC circuits, but this is most often not necessary since a temperature sensor is already available in most circuits.

Figure 4:
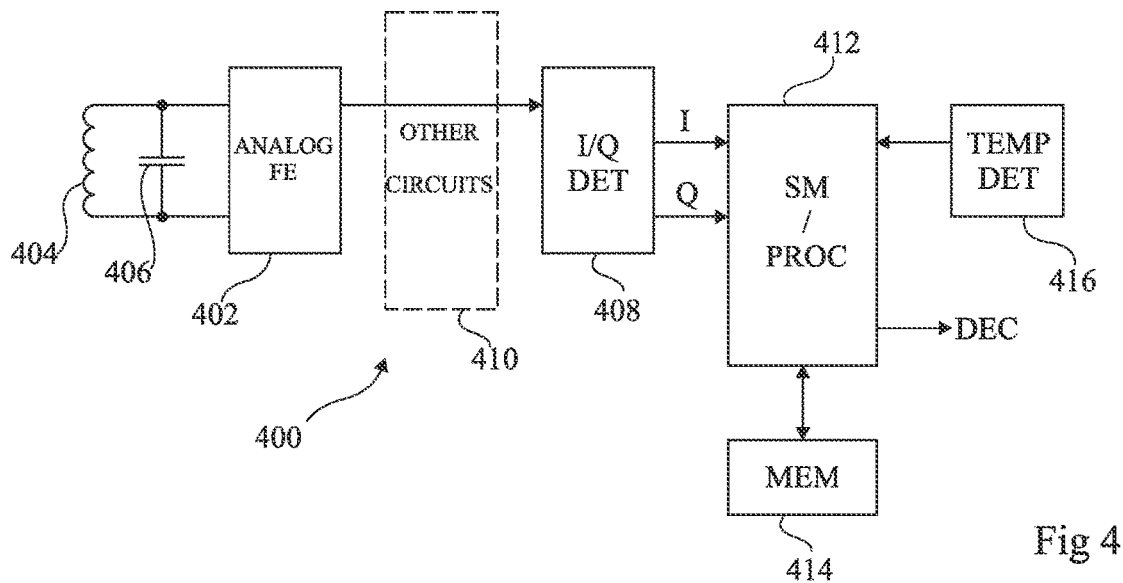
FIG. 4 shows an embodiment of a near-field communication circuit.

FIG. 4 schematically shows in the form of blocks an embodiment of a near-field communication circuit 400. This drawing does not show all the components of an NFC circuit but only some of the elements useful to the understanding of the described embodiments. In particular, only the reception by detection of the phase and amplitude variation of the signal across the oscillating circuit is considered.

Among the shown components, usual per se in a NFC circuit or router, one can find: analog circuits 402 (ANALOG FE), coupled to an antenna 404 forming, with one or a plurality of capacitive elements 406 internal or external to circuits 402, the oscillating circuit of the NFC device, circuits 402 including various impedance matching, shaping, amplification circuits, etc.; a baseband signal detector 408 (I/Q DET) coupled, via other analog-to-digital conversion, shaping, demodulation circuits 410 (OTHER CIRCUITS), etc., to the analog circuits 402, detector 408 delivering signals in phase I and in phase quadrature Q representative of the amplitude M and of the phase P of the signal across the oscillating circuit; and a state machine 412 (SM/PROC) or a processor for interpreting the values of the signals I and Q delivered by detector 408 and delivering, among others, a signal DET (typically 0/1) indicative of the result of the detection.

The state machine or processor 412 is associated (coupled) to at least one memory 414. Preferably, a plurality of memories (at least one volatile memory or registers and at least one non-volatile memory) are used to store the different quantities useful to the implementation of the detection method and particularly the detection thresholds and the temperature values.

The state machine or the processor also receives, among others, information representative of temperature, delivered by a temperature detector 416 (TEMP DET). Detector 416 is preferably integrated to NFC circuit 400 or placed close thereto to take into account a temperature representative of circuit 400 or of its close environment.

Other usual components and circuits of course equip circuit 400. In particular, only the signal DET indicative of a need to leave the standby mode (LPTD) to switch to the polling mode is considered.

Figure 5:
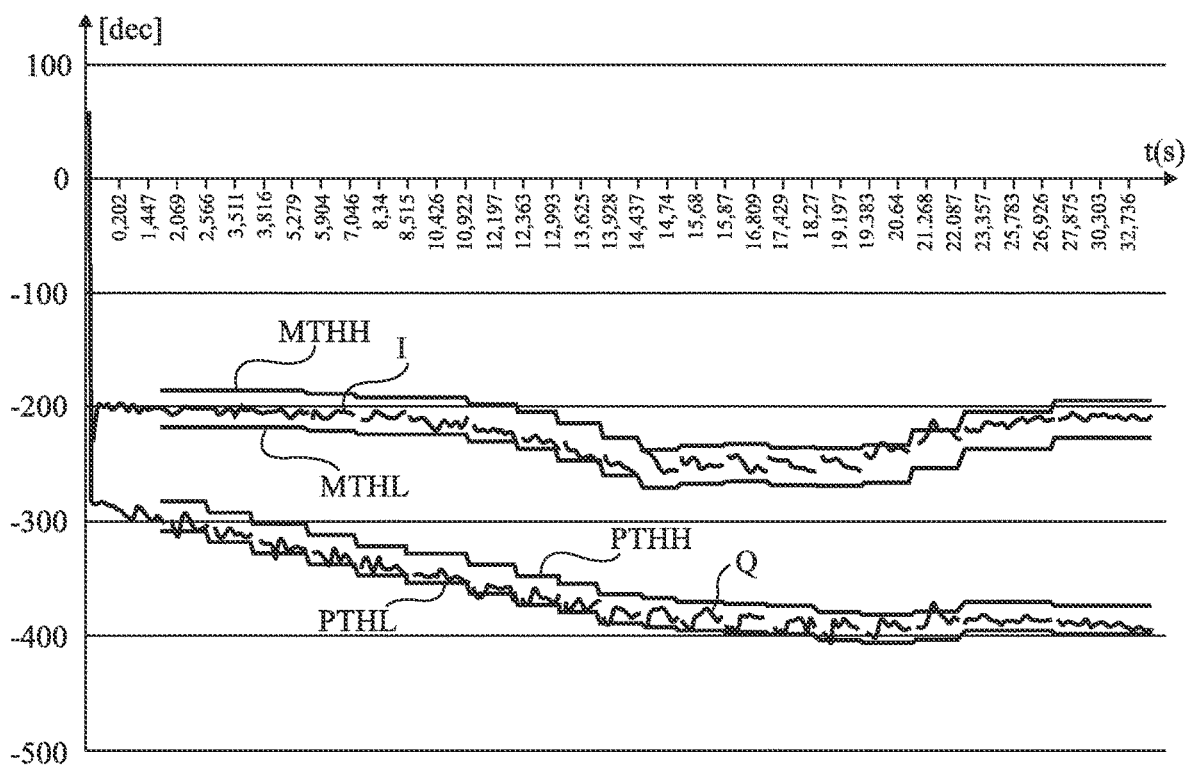
FIG. 5 illustrates, in timing diagrams, an operation of the circuit of FIG. 4.

FIG. 5 illustrates, in timing diagrams, the operation of circuit 400 in the presence of relatively slow temperature variations, that is, variations acceptable as compared with the variation time constant of the amplitude and phase threshold windows.

More particularly, FIG. 5 shows examples of respective variation curves, over time: of the signal I representative of the amplitude of the signal across the oscillating circuit; of the signal Q representative of the phase of the signal across the oscillating circuit; of the levels of the amplitude thresholds MTHH and MTHL defining, for signal I, the window where the devices are maintained in LPTD mode; and of the levels of the phase thresholds PTHH and PTHL defining, for signal Q, the window where the devices are maintained in LPTD mode.

The amplitudes or values of signals I and Q are expressed in digital values (in this example, from −512 to 511 [decimal]) due to the analog-to-digital conversion (here for example over 10 bits) performed at the output of the mixers delivering signals I and Q.

In FIG. 5, a case where no NFC device is within range of the device emitting the detection bursts is considered. Accordingly, signals I and Q remain inside of the detection windows or only come out of them for a duration shorter than the duration of confirmation phase 250 (FIG. 3).

Figure 6:
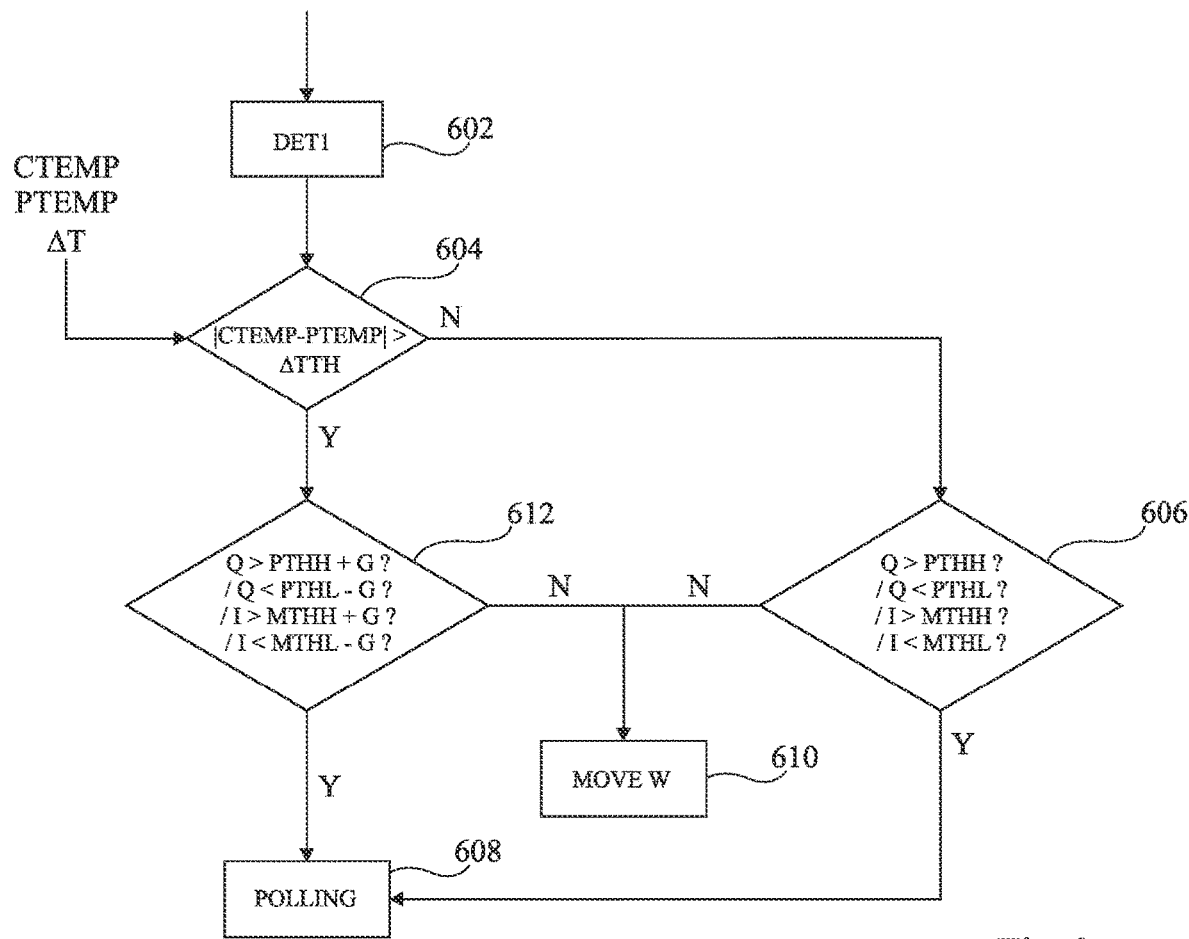
FIG. 6 very schematically shows in the form of blocks an embodiment of a detection validation method.

FIG. 6 very schematically shows in the form of blocks an embodiment of the method for validating the coming out of the LPTD mode according to the temperature time gradient.

The variation of detection thresholds MTHH, MTHL, PTHH, and PTHL is always performed by taking into account the prior measurements as in the methods illustrated in FIGS. 2 and 3.

According to the embodiment of FIG. 6, it is provided, in case of a detection of a crossing of one of thresholds MTHH, MTHL, PTHH, and PTHL, to validate or not the detection by comparing the obtained value I and Q (having crossed a threshold) with a threshold window adjusted according to the temperature variation speed. More precisely, a temperature difference threshold (delta) with respect to the previous temperature measurement and if the temperature has varied by more than this difference threshold, the detection window is widened by a defined margin.

According to this embodiment, the temperature is periodically measured by detector 416 (FIG. 4) and is stored in memory 414. Preferably, the temperature is measured for each detection burst. In this case, it is possible to only store the last temperature value and to overwrite the previous value. This is indeed sufficient to obtain the temperature variation gradient between two measurements. As a variant, the current temperature is compared with an average value of the temperature measured during a plurality of bursts.

For example, on detection of the crossing of one of the detection thresholds (block 602, DET1) by one of values I or Q or both, the difference between current temperature CTEMP and the temperature measured and stored during previous burst PTEMP (as a variant, averaged over a plurality of bursts), and it is verified (block 604, |CTEMP−PTEMP|>ΔTTH?) whether this difference exceeds, in absolute value, a predetermined temperature difference ΔTTH. According to another example, the temperature is measured during each threshold calibration phase (implementation in the absence of detection of a device in the field, for example, as described in document EP 3495986) as well as preferably, as a result of a detection 602 indicated by the state machine. For example, the temperature is measured during detection 602 and, during test 604, it is compared with that measured during the calibration if it is the first detection 602 or during the previous detection when it is an n-th detection 602.

If test 604 indicates that the temperature variation is smaller than the threshold (output N of block 604), this means that one is, a priori, in the presence of a second device. According to a simplified embodiment, the crossing of the threshold by quantity I or Q having caused the triggering of the validation process is validated and the low-power detection mode is then exited and it is switched to the polling mode. Preferably, as shown, a new test is performed (block 606, Q>PTHH?/Q<PTHL?/I>MTHH?/I<MTHL?) with respect to the current detection windows. If this second test confirms the first one having caused the switching to the validation phase (output Y of block 606), the low-power detection mode is then exited and it is switched to the polling mode (block 608, POLLING). In the opposite case (output N of block 606), the device remains in LPTD detection mode. However, to take into account the temperature increase, if necessary, more rapidly than the calibration loop taking into account the variation of the corresponding value I or Q, the considered threshold window W is centered back on the current value I or Q (block 610, MOVE W).

If temperature gradient ΔT is greater than threshold ΔTTH (output Y of block 604), one compares (block 612, Q>PTHH+G?/Q<PTHL−G?/I>MTHH+G?/I<MTHL−G?) the values I, Q, having caused the triggering of the validation process with a threshold increased (in absolute value) by a margin G. This amounts to enlarging the considered threshold window by an amplitude 2G.

If the corrected threshold has not been crossed by the value having caused the triggering of the validation process (output N of block 612), the considered threshold window W is centered back on current value I or Q (block 610, MOVE W) and the device remains in LPTD mode.

If the corrected threshold has been crossed by the value having caused the triggering of the validation process (output Y of block 612), this means that one is effectively, a priori (to be confirmed by the polling phase), in the presence of another NFC device in the field. The low-power mode is then exited and it is switched to the polling mode (block 608, POLLING).

Figure 7:
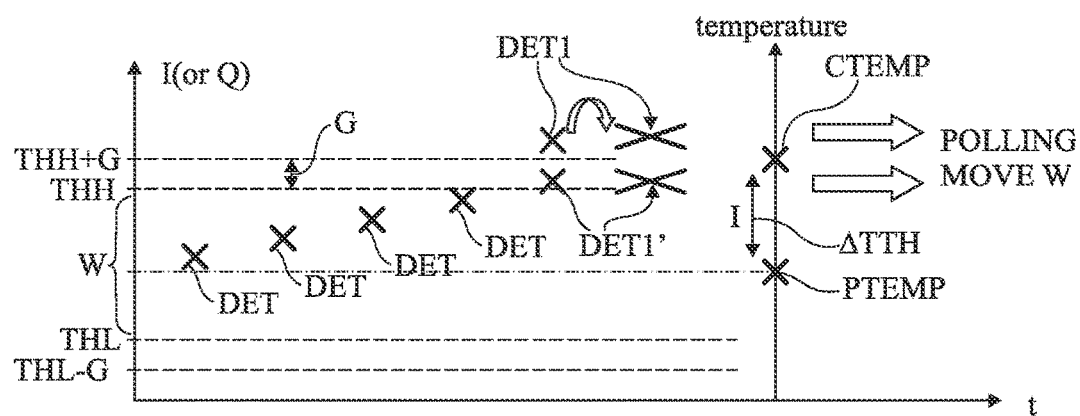
FIG. 7 illustrates, in timing diagrams, the operation of the embodiment of FIG. 6.

FIG. 7 illustrates, in timing diagrams, the operation of the embodiment of FIG. 6. More particularly, FIG. 7 illustrates examples of values DET of I or of Q (I (or Q)) taken during detection bursts and two examples DET1 and DET1' of crossing of the current window resulting, for one (DET1), in a holding in LPTD mode and, for the other (DET1), in the switching to the polling mode.

The value of threshold ΔTTH depends on the application and more particularly on the thermal environment of the NFC circuit. This value is for example determined on design of the NFC device according to the nature of the electronic circuits close to the NFC circuit. For example, it is determined by simulation or based on measurements enabling to verify the behavior of the NFC circuit during abrupt temperature variations. According to another example, this value ΔTTH is parameterizable to allow a manufacturer of NFC devices integrating an NFC circuit to adjust this value according to their product.

As a specific example of embodiment, threshold ΔTTH is in the range from 2 to 5° C., preferably in the order of 3° C.

Figure 8:
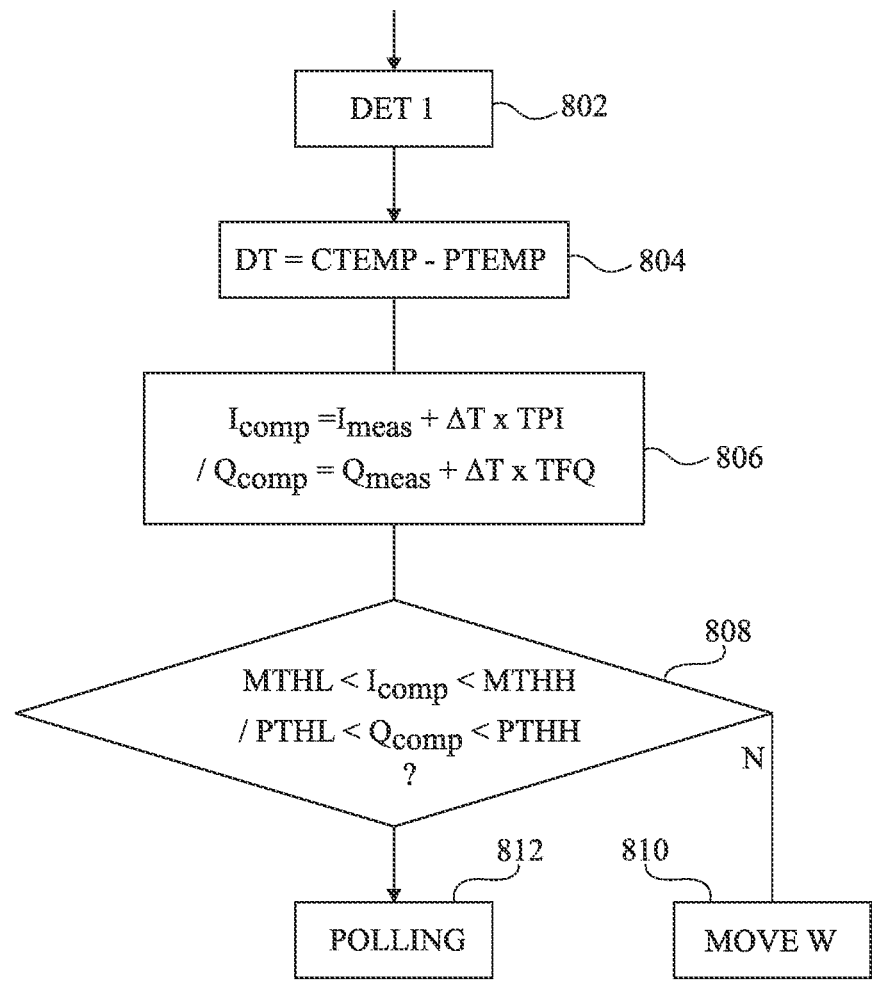
FIG. 8 very schematically shows in the form of blocks another embodiment of a detection validation method.

FIG. 8 very schematically shows in the form of blocks another embodiment of the method of validation of the leaving of the LPTD mode according to the temperature gradient.

The variation of detection thresholds MTHH, MTHL, PTHH, and PTHL is, here again, always performed by taking into account prior measurements as in the methods illustrated in FIGS. 2 and 3.

According to the embodiment of FIG. 8, it is provided, in case of a detection of a crossing of one of thresholds MTHH, MTHL, PTHH, and PTHL, by value I and/or Q, to validate or not the detection by performing the comparison again, but based on values I and Q compensated according to the time gradient of temperature. As compared with the embodiment of FIG. 6, it is not only acted on the thresholds, but on the measured values.

As in the case of FIG. 6, a difference (delta) between the current temperature and the previous temperature measurement is defined. This difference is then assigned a weighting coefficient, preferably different for the I path and for the Q path, and the result is added to the measured value of I and/or Q to perform the comparison with respect to the thresholds again.

Similarly, the temperature is periodically measured by detector 416 (FIG. 4) and is stored in memory 414. Preferably, the temperature is measured for each detection burst. It is possible to only store the last temperature value and to overwrite the previous value. This is indeed sufficient to obtain the gradient of the temperature variation between two measurements. As a variant, the current temperature is compared with an average value of the temperature measured during a plurality of bursts.

For example, on detection of the crossing of one of the detection thresholds (block 802, DET1) by one of values I or Q or both, the difference ΔT between current temperature CTEMP and the temperature measured and stored during previous burst PTEMP (as a variant, averaged over a plurality of bursts) is calculated (block 804, ΔT=CTEMP−PTEMP).

Then (block 806, Icomp=Imeas+ΔT×TFI/Qcomp=Qmeas+ΔT×TFQ), a temperature-compensated value Icomp and/or Qcomp (according to the value I and/or Q which has caused the triggering of the validation process) is calculated by adding, to the measured value Imeas and/or Qmeas, the value of the temperature difference ΔT weighted by a coefficient TFI or TFQ, preferably different for the Q path and for the I path.

The comparison with the thresholds defining the windows of amplitude and/or phase values is performed again (block 808, MTHL<Icomp<MTHH/PTHL<Qcomp<PTHH?).

If the temperature-compensated value remains in the threshold window (output N of block 808), this means that one is in the presence of a heating, and not in the presence of another NFC device in the field. The device will then remain in LPTD low-power detection mode. Preferably, to take into account the temperature increasing more rapidly than the calibration loop taking into account the variation of the corresponding value I or Q, the considered threshold window W is centered back on the current value Imeas or Qmeas (block 810, MOVE W).

If the temperature-compensated value comes out of the threshold window (output Y of block 808), this means that one is effectively, a priori (to be confirmed by the polling phase), in the presence of another NFC device in the field. The low-power mode is then exited and it is switched to the polling mode (block 812, POLLING).

The values of the weighting coefficients depend on the application and more particularly of the thermal environment of the NFC circuit. These values are, for example, determined on design of the NFC device according to the nature of the electronic circuits close to the NFC circuit. For example, they are determined by simulation or based on measurements enabling to verify the behavior of the NFC circuit towards abrupt temperature variations. According to another example, these values TFI and TFQ are parameterizable to enable a manufacturer of NFC devices integrating an NFC circuit to adjust these coefficients according to their product.

As a specific example of embodiment, coefficient TFI is in the range from 10 to 50 (/° C.), preferably in the order of 30 per degree C. Still as a specific example of the embodiment, coefficient TFQ is in the range from −2 to −10 (/° C.), preferably equal to −4 per degree C.

Although it is possible to implement the validation process, be it according to one or the other of the embodiments, in a detection method of the type of that illustrated in FIG. 2, that is, as soon as a threshold has been crossed, it is preferred to only implement it when this crossing occurs in a confirmation phase such as illustrated by the embodiment of FIG. 3. This enables to decrease the need to implement the validation process.

Figure 9:
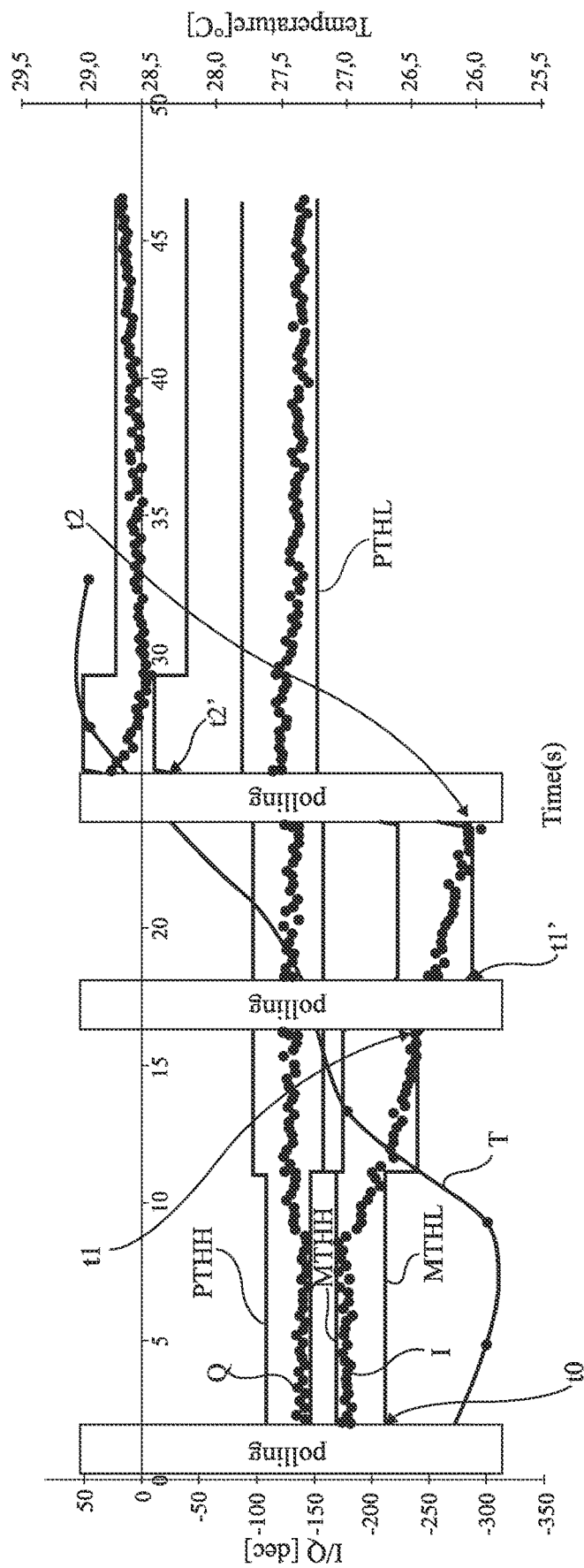
FIG. 9 illustrates, in timing diagrams, an example of operation of a method of detection with no validation.

FIG. 9 illustrates, in timing diagrams, an example of operation of a method of detection under the effect of an abrupt temperature variation, with no implementation of the validation method.

This drawing shows examples of variation curves of quantities I, Q, of thresholds MTHH, MTHL, PTHH, PTHH, as well as an example of a variation curve of temperature T.

It is assumed that at a time t0, a polling phase is exited to switch to the LPTD detection mode.

The threshold windows vary by taking into account, in smoothed fashion, temperature variations, that is, relatively slowly.

It is assumed that at a time t1, the abrupt increase in temperature T causes the crossing of threshold MTHL by a detection burst. This results in the triggering of a new polling phase. Since this triggering is under the effect of temperature, the polling phase only lasts for in the order of from one to two seconds and, at a time t1', it is returned to the LPTD mode. The amplitude threshold window has kept on decreasing in amplitude by the taking into account of the initial temperature decrease (caused by the cooling linked to the stopping at time t0 of the first polling phase).

Since the temperature keeps on increasing after time t1', one rapidly ends up (time t2) triggering again a new polling phase after a new crossing of threshold MTHL. This phase caused by the temperature increase here again only lasts from one to two seconds and, at a time t2', it is returned to the LPTD mode.

Figure 10:
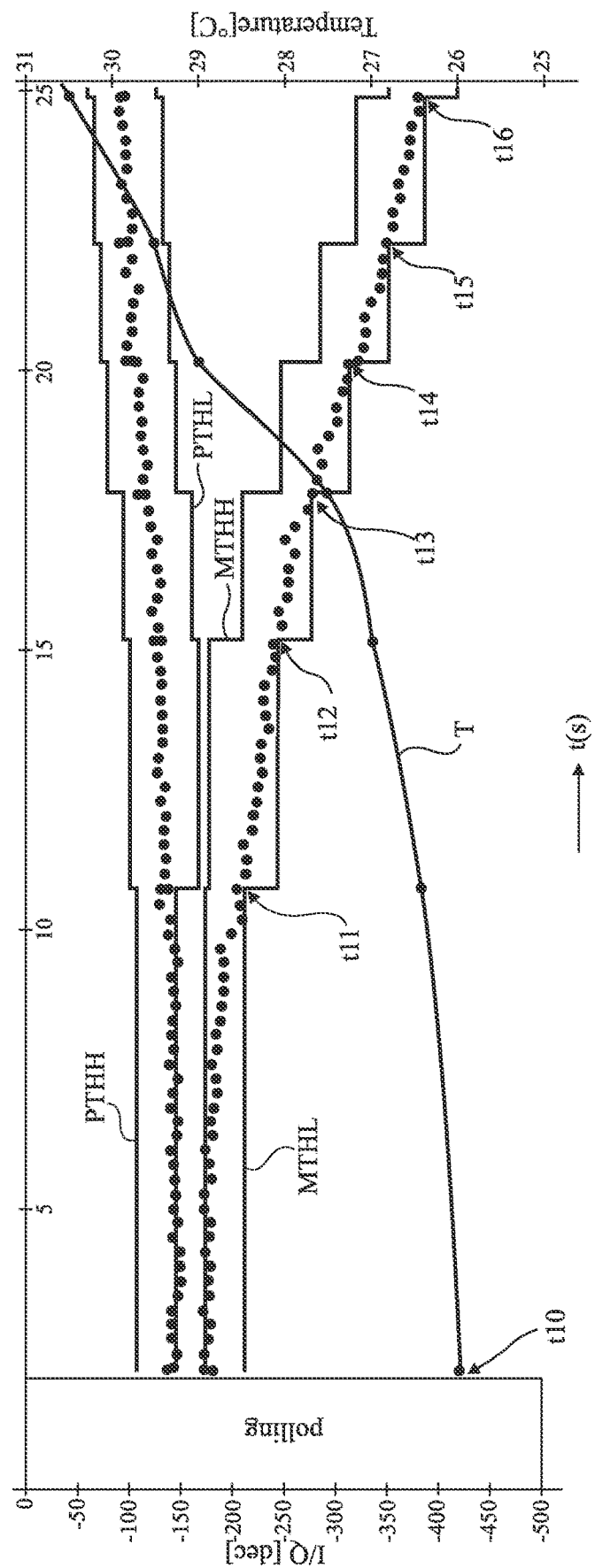
FIG. 10 illustrates, in timing diagrams, an example of operation of the method of detection with a validation.

FIG. 10 illustrates, in timing diagrams, an example of operation of a method of detection under the effect of an abrupt temperature variation, with no implementation of the validation method described in relation with FIG. 8.

This drawing shows examples of variation curves of quantities I, Q, of thresholds MTHH, MTHL, PTHH, PTHH, as well as an example of a variation curve of temperature T, to be placed in relation with the example of FIG. 9.

It is assumed that at a time t10, a polling phase is exited to enter the LPTD detection mode.

As compared with the case of FIG. 9, it can be seen that here, under the double effect of the second comparison based on temperature-compensated values and on the adjustment of the threshold window each time (times t11, t12, t13, t14, t15, t16) this second comparison is performed, it is not switched to the polling mode despite the temperature increase.

An advantage of the described method is that it enables to avoid false triggering of the polling mode, in particular as a result of the activation of another circuit of the device than the NFC circuit.

Another advantage of the described method is that it is compatible with a software implementation (by a program executed by a processor associated with a non-transient storage support, for example, a non-volatile memory, comprising instructions adapted to the implementation of the described method) as well as with a hardware implementation (by a programmable or wired logic state machine).

Various embodiments and variants have been described. Those skilled in the art will understand that certain features of these various embodiments and variants may be combined, and other variants will occur to those skilled in the art. In particular, although the embodiments have been described in relation with the temperature variation speed, they transpose to the taking into account of other parameters of the NFC circuit such as, for example, the gradient or speed of variation of the power supply voltage.

Finally, the practical implementation of the described embodiments and variations is within the abilities of those skilled in the art based on the functional indications given hereabove.

The invention claimed is:

1. A method, comprising:
making a potential detection, by a first near field communication (NFC) device, of a second NFC device; and
validating said potential detection of the second NFC device by the first NFC device dependent on a time variation gradient of at least one environmental condition of the first NFC device, the detection being:
identified by a value of at least one characteristic quantity, from among amplitude and phase, of a signal at terminals of an oscillating circuit of the first NFC device, crossing detection thresholds; and
validated based on a result of one of:
compensating the detection thresholds based on the time variation gradient of the at least one environmental condition, and comparing the value of the at least one characteristic quantity to the compensated detection thresholds; and
compensating the value of the at least one characteristic quantity based on the time variation gradient of the at least one environmental condition, and comparing the compensated value to the detection thresholds.

2. The method according to claim 1, wherein the at least one environmental condition is a temperature.

3. The method according to claim 1, wherein the detection thresholds correspond to a first threshold and a second threshold which delimit a range of values of the at least one characteristic quantity.

4. The method according to claim 1, wherein the detection thresholds delimit a range of values of said at least one characteristic quantity without presence of the second NFC device.

5. The method according to claim 1, further comprising performing the comparing of the value of the at least one characteristic quantity to the compensated detection thresholds when said time variation gradient is greater than a threshold gradient and validating the potential detection when said time variation gradient is less than or equal to the threshold gradient.

6. The method according to claim 1, wherein said time variation gradient corresponds to a variation of said at least one environmental condition between two detection phases.

7. The method according to claim 1, wherein the first NFC device comprises at least two operating modes comprising a first mode where detection bursts are spaced apart by a duration corresponding to at least one hundred times a duration of the detection bursts.

8. The method according to claim 1, further comprising switching the first NFC device to an operating mode of emission of a polling sequence when the second NFC device is detected within range.

9. A computer program product, comprising instructions adapted to implement the method of claim 1 when it is executed by a processor, wherein the computer program product is embodied on a non-transitory computer readable medium.

10. An electronic device, comprising said processor configured to execute the computer program product according to claim 9.

11. An electronic circuit configured to implement the method according to claim 1.

12. An electronic device, comprising the electronic circuit according to claim 11.

13. A method for validation of a potential detection, by a first near field communication (NFC) device, of a second NFC device, comprising:
identifying a crossing of first detection thresholds by a value of at least one characteristic quantity among an amplitude and a phase of a signal across an oscillating circuit of the first NFC device to make said potential detection; and
validating the potential detection of the second NFC device in response to comparison of the value of at least one characteristic quantity among the amplitude and the phase of the signal to second detection thresholds, the second detection thresholds being set by calculating a time variation gradient of at least one environmental condition of the first NFC device by dividing a difference between a first measurement and a second measurement of said at least one environmental condition by a time interval between said measurements, and adjusting the first detection thresholds as a function of said calculated time variation gradient.

14. The method according to claim 13, wherein the at least one environmental condition is temperature.

15. The method according to claim 13, wherein the first detection thresholds delimit a range for the value of at least one characteristic quantity in an absence of the second NFC device.

16. The method according to claim 13, wherein validating is performed when the time variation gradient is greater than a threshold gradient.

17. The method according to claim 13, wherein the time variation gradient corresponds to a variation of said at least one environmental condition between two NFC detection phases.

18. An electronic circuit configured to implement the method according to claim 13.

19. A method for validation of a potential detection, by a first near field communication (NFC) device, of a second NFC device, comprising:
identifying a crossing of first detection thresholds by a value of at least one characteristic quantity among an amplitude and a phase of a signal across an oscillating circuit of the first NFC device to make said potential detection; and
validating said potential detection of the second NFC device in response to comparison of a compensated value of the at least one characteristic quantity among the amplitude and the phase of the signal compensated based on a time variation gradient of at least one environmental condition of the first NFC device, wherein said time variation gradient is calculated by dividing a difference between a first measurement and a second measurement of said at least one environmental condition by a time interval between said measurements, against said first detection thresholds.

20. The method according to claim 19, wherein the at least one environmental condition is temperature.

21. The method according to claim 19, wherein the first detection thresholds delimit a range for the value of at least one characteristic quantity in an absence of the second NFC device.

22. The method according to claim 19, wherein validating is performed when the time variation gradient is greater than a threshold gradient.

23. The method according to claim 19, wherein the time variation gradient corresponds to a variation of said at least one environmental condition between two NFC detection phases.

24. An electronic circuit configured to implement the method according to claim 19.

25. A method, comprising:

making a potential detection, by a first near field communication (NFC) device, of a second NFC device; and validating said potential detection of the second NFC device by the first NFC device dependent on a time variation gradient of variation of at least one environmental condition of the first NFC device, wherein said validating comprises:

determining a difference in said at least one environmental condition between a first measurement and a second measurement;

comparing the determined difference to a threshold difference value; and if the determined difference is below the threshold difference value, performing a first validation comparison of a characteristic quantity of a signal from the first NFC device to a first set of detection thresholds; and if the determined difference is above the threshold difference value, performing a second validation comparison of the characteristic quantity to a second set of detection thresholds, the second set of detection thresholds being different from the first set of detection thresholds.

26. The method according to claim 25, wherein said time variation gradient corresponds to a variation of said at least one environmental condition between two detection phases.

27. The method according to claim 25, wherein the first NFC device comprises at least two operating modes comprising a first mode where detection bursts are spaced apart by a duration corresponding to at least one hundred times a duration of the detection bursts.

28. The method according to claim 25, further comprising switching the first NFC device to an operating mode of emission of a polling sequence when the second NFC device is detected within range.

* * * * *